United States Patent [19]

Kaminski et al.

[11] Patent Number: 5,272,198

[45] Date of Patent: Dec. 21, 1993

[54] ASBESTOS-FREE MICRODENIER ACRYLIC FIBER REINFORCED MATERIAL FOR GASKETS AND THE LIKE

[75] Inventors: Stanley S. Kaminski, Stamford; Robert E. Evans, Huntington, both of Conn.

[73] Assignee: American Cyanamid Company, Stamford, Conn.

[21] Appl. No.: 31,090

[22] Filed: Mar. 12, 1993

[51] Int. Cl.$^5$ .............................................. C08H 3/26
[52] U.S. Cl. ..................... 524/426; 277/235 A; 277/235 B; 277/DIG. 6; 428/224; 428/283; 428/288; 428/297; 428/373; 428/903; 524/425; 524/445; 524/448; 524/449; 524/451; 524/525; 525/123; 525/232; 525/233; 525/238
[58] Field of Search ......... 277/235 A, 235 B, DIG. 6; 524/448, 449, 451, 425, 426, 445, 525; 428/224, 283, 288, 297, 324, 325, 373, 903; 525/123, 232, 233, 213, 238

[56] References Cited

U.S. PATENT DOCUMENTS 4,330,442 5/1982 Lindeman et al. .................... 524/16
4,387,178 6/1983 Tracy et al. ......................... 524/448
4,423,109 12/1983 Greenman et al. ................. 428/288
4,866,109 9/1989 Hibbard et al. ....................... 524/5

FOREIGN PATENT DOCUMENTS 1179569 1/1970 United Kingdom .

OTHER PUBLICATIONS

Research Disclosure 27696 Apr. 1987 DuPont Company Kevlar ® 02004810 Pulp for Viscosity Control.
Orbit Search Accession Number 91-104961/15 Abstract of Japanese Patent Publication No. J03045685 91/02/27 Gasket Compositions.
Orbit Search Accession Number 92-367654/45 Abstract of European Patent Publication No. 511838-A1 92/11/04 Short PAN fiber-reinforced Rubbers.

Primary Examiner—James J. Bell

[57] ABSTRACT

Improved asbestos-free fiber reinforced material for use in the manufacture of gaskets, and the like, comprises (a) an elastomeric binder material and (b) microdenier acrylic fibers with a small diameter of up to about 12 microns, and a minimum aspect ratio in the 20-50 range so as to enhance the flexibility and the strength of the gaskets, shock mountings, timing belts, sealants, and the like, made from such materials.

40 Claims, 1 Drawing Sheet

ASBESTOS-FREE MICRODENIER ACRYLIC FIBER REINFORCED MATERIAL FOR GASKETS AND THE LIKE

This invention relates to the use of microdenier acrylic fibers as reinforcements for asbestos-free materials to make gaskets, and the like. More particularly, it relates to the manufacture of a microdenier acrylic fiber-reinforced compressible material and particularly to a material useful in the manufacture of gaskets, pneumatic tires, shock mountings, timing belts, sealants, other molded rubber and elastomeric articles, and the like. The present invention is also directed to such materials comprising an elastomer and microdenier acrylic fibers. Accordingly, the general objects of the present invention are to provide an improved asbestos-free material and articles of manufacture made therefrom.

BACKGROUND OF THE INVENTION

Asbestos fiber-containing articles such as gaskets, brake linings, pneumatic tires, conveyor belts, timing belts, power transmission couplings, shock absorbers, sealants, paints, and the like, are well-known and have achieved significant commercial success. Unfortunately, recent medical evidence indicates that asbestos fibers can cause health hazards, particularly when inhaled. These health hazard problems of asbestos fibers are well-known also, and accordingly, the industry has been searching for replacement compositions for forming gaskets, and the like, which do not contain asbestos fibers, but yet achieve substantially the same physical and chemical properties.

Acrylic fibers have been added to organic thermosetting plastic matrices to improve one or more properties of the matrices. For example, DeMaria and Relmond in U.S. Pat. No. 4,352,852, assigned to the same assignee as the instant application, show that from about 10 to about 90 weight percent of an acrylonitrile polymer fiber having a straight tenacity of at least about 5.0 grams per denier, reinforces thermosetting resins, such as polyesters and peroxide curatives, much better than the widely used glass fibers. The required tenacity is obtained by post stretching a conventional wet spun acrylonitrile polymer fiber in steam under pressure to obtain a higher than normal tenacity. The fibers used are of conventional diameter, i.e., they are "normal denier" fibers, having a diameter of about 20 microns, i.e., greater than about 12 microns.

Greenman, et al, in U.S. Pat. No. 4,423,109, describe fiber reinforced rubber gasket materials, in which one of the fiber materials can comprise glass fibers, and another can comprise polyacrylics, e.g., polyacrylonitrile fibers. No preference is stated or disclosed as between glass, on the one hand, or polyacrylics, on the other, and nothing is suggested that would teach using fibers with diameters in the "microdenier" range, i.e., those less than 12 microns in diameter, and especially from about 5 to about 10 microns in diameter.

Many other proposals have been put forth to replace asbestos fibers in a variety of end uses. Mention can be made, for example of U.K. Patent No. 1,179,569 (tires); EPO Patent Publication No. 0 511 838 (marine couplings and timing belts); Research Disclosure No. RD 276096A (4/10/87) and U.S. Pat. No. 4,820,585 (sealants and coatings); and U.S. Pat. Nos. 4,330,442, 4,387,178, 4,423,109, and 4,866,109 and Japanese Patent Publication No. J03045685 (2/27/91) (gaskets).

Especially important are fiber replacements for asbestos fibers in gasket-forming compositions, because, in order to meet government regulations regarding the emissions of certain gases, such as hydrocarbons and halogens, gaskets in mechanically jointed flanges must be able to maintain their seal and prevent leakage of fluids and gases even when subjected to an extremely severe operating environment and undesirable mechanical conditions. Thus, these gaskets must be able to function even though the flanges are either poorly designed or poorly machined and must maintain the ability to seal the flange and prevent leakages even under high operating temperatures and high internal pressures. Gaskets produced from many prior art materials proposed to replace asbestos fibers, either leak or blow out when exposed to the aforementioned conditions and environments. A significant practical drawback in the prior art gasketing materials is less than optimum flexibility and lower than optimum elongation. This is especially noted with glass or cellulose fibers or polyaramide fibers as the reinforcement, primarily because of their lack of ability to provide adequate elongation and flexibility to the gasket. Flexibility is important from a practical standpoint because a gasket must be able to survive handling, cutting and packaging procedures prior to installation, without cracking or loss of design geometry. Normal denier acrylic fibers provide many advantages in such uses over the others mentioned because they are uniquely adapted to elastomeric matrix resin wet-out, even without the use of sizing agents on their surface to "couple" to the resin and thereby enhance wetting and reinforcement.

Typical of state-of-the art compositions and methods are those disclosed in Hibbard, et al, U.S. Pat. Nos. 4,837,281, and 4,866,109, which describe making reinforced gasketing materials by cutting acrylic fibers and using them to reinforce rubbers which are converted to cured sheets for use as gaskets. These citations do not disclose the use of "microdenier" fibers, however.

Lindeman et al, U.S. Pat. No. 4,330,442, describe asbestos-free gasket forming materials by a beater-additive process in which the fibers comprise phenolic fibers mixed with aromatic polyamide fibers. As will be shown hereinafter these fibers do not provide end products having the optimum elongation and they are not "microdenier" fibers.

Tracey et al, U.S. Pat. No. 4,387,178, describe compressible soft asbestos-free gasket materials by a beater-additive process in which the fibers comprise fibrillated aromatic polyamide fibers. As will be shown hereinafter such fibers do not provide end products with the optimum elongation and the compositions are not made with "microdenier" acrylic fibers.

Nakahara et al, EPO Patent Publication No. 511,838-A1, is also of interest in this connection because it deals with fibrillated polyacrylonitrile short (but not less than 10 microns in length) fibers dispersed in a rubber, to provide high strength and high modulus and good rubber fiber interaction. The compositions are vulcanizable with organic peroxides and also with sulfur to produce timing belts, marine materials, chains, rubber springs, and the like, all uses formerly employing asbestos.

In general, with particular reference to acrylic fibers, e.g., fibers of a co-polymer containing acrylonitrile in a quantity more than 85 wt. %, these have good extensibility, which prevents their fragmentation during mixing, and they adhere well to most resin systems because of the polar nitrile groups present in the molecule.

These attributes make them desirable materials to consider for use in replacing asbestos, in uses where flexibility enhancement and extensibility in resin systems is needed while maintaining or increasing the strength of the resulting resin-fiber composite. Modacrylic fibers with more than 35 wt. % and generally less than 85 wt. % acrylonitrile in the co-polymer provide also good extensibility, resistance to fragmentation during mixing and good adhesion to most resin systems, while also providing other attractive attributes such as fire retardancy. Consequently, they also are desirable materials for replacing asbestos.

In summary, the citations above show that, in the present state of the art, fibrous organic reinforcements are known to be suitable replacements for inorganic reinforcing fibers, like glass, in materials for making gaskets, belts, tires, sealants, and the like, and the fibers may specifically comprise acrylic fibers. Microdenier acrylic fibers having diameters of below about the normal 12 microns of the prior art, however, have not been described as reinforcing agents for elastomeric rubbery resin matrices, and especially no acrylic fiber reinforcements for gasket materials having such small diameters have been described for use as reinforcing agents for gasket materials, and the like.

Figure 1:
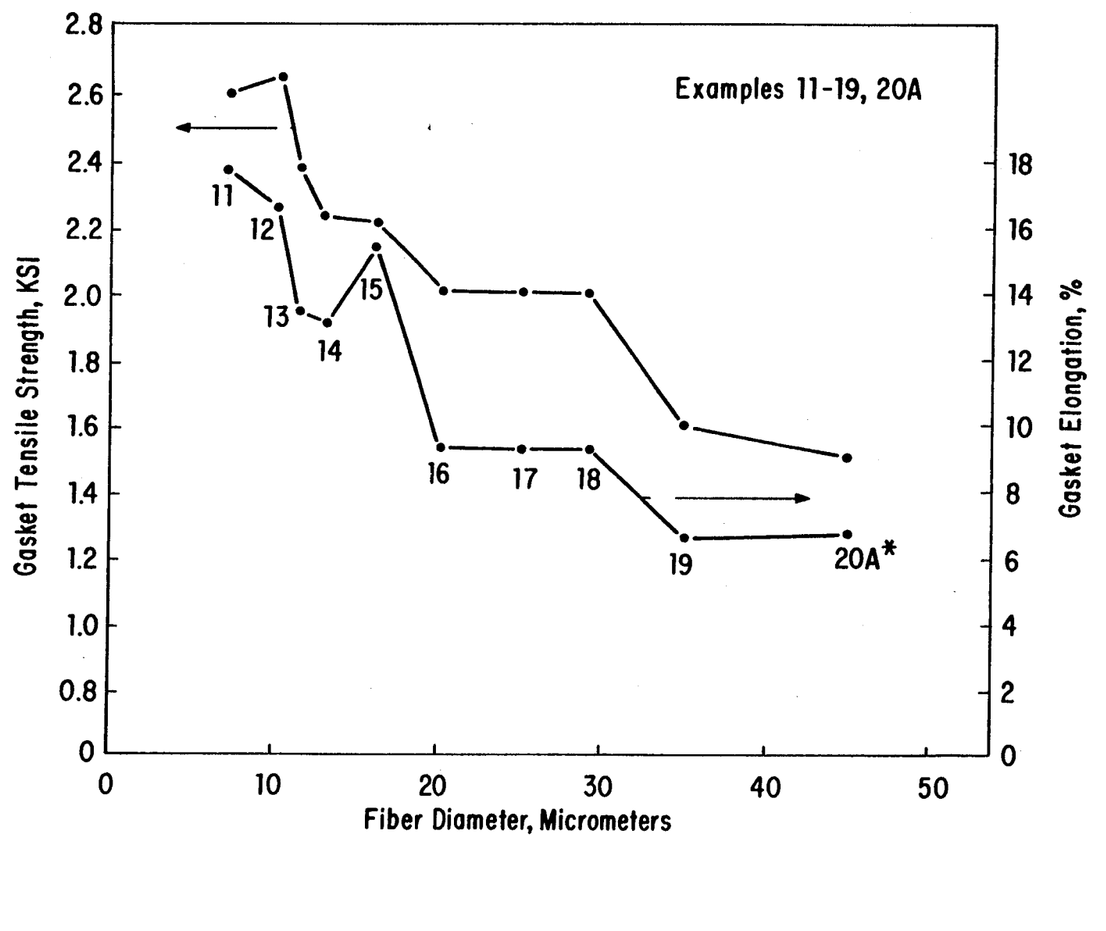

It has now been discovered, and is the subject of this invention, that selecting and using acrylic fibers produced by means of a process which provides very small diameters of not greater than about 12 microns results in an unexpected enhancement in their ability to increase flexibility of elastomeric resin binder systems for materials to produce gaskets, shock absorbers, rubber springs, pneumatic tires, sealants, and the like, and at the same time increases resin-fiber bonding and gasket strength. For example, as will be shown in the accompanying drawing, keeping all other variables constant, reducing the fiber denier from 10 to 0.5, will increase the elongation of a model gasket composition by 20 to 100%. Surprisingly also, this is accomplished with a concomitant increase in tensile strength. Such a reduction would not have been predicted because, generally speaking, if the stiffness of a reinforcing fiber is lowered, the elongation of that fiber and a gasket containing it would be expected to increase. However, since the fiber is then less stiff, reinforcement will be sacrificed and the gasket strength will suffer. Therefore, based on the data presented hereinafter it is assumed that the fiber properties do not change significantly with diameter, so that solely due to small diameter, gasket elongation and strength are both enhanced. Such results are nowhere foreshadowed by the prior art and demonstrate manifest advantages in using fibers prepared in accordance with the present invention as reinforcing agents for materials to make gaskets and the like. It will also be shown that the effectiveness of the microdenier acrylic fibers as a reinforcement is greater than other organic fibers, such as aromatic polyamides, especially in elongation characteristics which are vitally important in gaskets.

It is a principal object of the present invention to provide materials for gaskets and the like, reinforced with microdenier acrylic fibers, i.e., fibers with a denier less than 10, and especially less than 1.0, to enhance flexibility and to increase the strength of gaskets manufactured from such materials, while maintaining satisfactory mixing, processing and surface characteristics. The fibers can be unfibrillated or in the form of a pulp. The comparative examples will demonstrate that the fibers provide excellent reinforcement and flexibility properties because of their extremely small diameter, all other variables being constant. The comparative examples will show that upon curing the acrylic fibers will improve the mechanical properties of the material, by virtue of their extremely small diameters, all other variables being constant. Extensibility (elongation) of elastomeric materials is also increased compared to other fibrous reinforcements, other than asbestos, which has harmful effects on the environment. Because of the good UV resistance and low moisture absorption of the acrylic fibers, they are well suited for outdoor applications. Also, because of their good hydrocarbon and other chemical resistance they are well suited as automotive parts, tires, fuel tank and chemical tank sealant components, as well as in gaskets.

BRIEF DESCRIPTION OF THE DRAWING

The drawing is a graphical representation of the effect of reducing fiber diameter on model gasket tensile properties. The data comprise tensile and elongation values obtained from sheets made by molding sheets of compositions of nitrile rubber and talc filler reinforced with ten polyacrylonitrile fibers of respectively decreasing denier and the data points show that microdenier fibers provide the highest elongations with a marked improvement in tensile strength.

SUMMARY OF THE INVENTION

According to the present invention, there are provided asbestos-free fiber reinforced materials comprising:
(a) an elastomeric matrix composition; and
(b) an effective reinforcing amount of acrylic fibers with a small diameter of less than about 12 microns, a length ranging from about 0.5 to about 3 mm, and having a minimum aspect ratio (L/D) in the 20-50 range, so as to provide enhanced strength and flexibility to gaskets, tires, timing belts, power transmission couplings, shock absorbers, sealants, and the like, made therefrom.

In another aspect, the present invention contemplates reinforced gaskets produced from asbestos-free gasket material as above defined wherein the reinforcement (b) comprises microdenier monocomponent or bicomponent fibers of a polymer containing acrylonitrile in a quantity more than 35 wt. %, said fibers having a fiber diameter of less than about 12 microns, a fiber length greater than 0.5 mm, and a minimum aspect ratio in the range of 20-50, so as
(i) to provide the gasket with improved flexibility, and
(ii) to provide a gasket with greater elongation in comparison with a gasket reinforced with the corresponding fibers having a diameter of greater than 12 microns.

In still another principal aspect of the present invention, there are provided compositions adapted for use in asbestos-free gaskets, the compositions comprising:
(a) an curable elastomeric resin and a curative therefore, alone, or in further combination with:
 (i) a pigment,
 (ii) a dye,
 (iii) a heat stabilizer,
 (iv) an antioxidant,
 (v) a plasticizer,
 (vi) a lubricant,
 (vii) a UV-stabilizer,
 (viii) a flame-retardant agent,
 (ix) a processing aid, (x) a foaming agent,
(xi) a filler,
(xii) non-acrylic organic fibers and pulps,
(xiii) inorganic fibers selected from glass, ceramic, mineral fibers, and the like, or
(xiv) a mixture of any of the foregoing, and (b) an effective concentration of a reinforcement for said composition, said reinforcement comprising microdenier acrylic fibers with a small diameter of less than 12 microns, a minimum length in the range or 0.5–3 mm, and a minimum aspect ratio (L/D) in the 20–50 range so as to provide a gasket with increased elongation in comparison with those made from corresponding acrylic fibers having a diameter of greater than 12 microns.

Especially useful embodiments of the invention are beater additive gaskets made from asbestos-free gasket forming compositions comprising in weight parts per 100 parts of the total fiber and filler weight about 5 to 25 parts of microdenier acrylic fibers with a small diameter of less than 12 microns, a minimum length in the range or 0.5–3 mm, and a minimum aspect ratio (L/D) in the 20–50 range, alone, or in further combination with about 10 to 25 parts of other fibers; about 40 to 70 parts of at least one inorganic filler; and 10 to 40 parts added-on of a synthetic rubber binder.

In preferred features the invention contemplates compositions as defined above wherein the acrylic fibers (b) are non-fibrillated; those comprised of a polymer containing acrylonitrile in a quantity more than 35 wt. %; those having an average diameter in the range of about 2–12 micrometers; and those having an aspect ratio (L/D) of greater than about 100.

DETAILED DESCRIPTION OF THE INVENTION

The term "acrylic fibers", as used herein and in the appended claims include fibers obtained by the wet-spinning, dry-spinning, flash-spinning, air gap-spinning, etc., of homopolymers of acrylonitrile, of copolymers containing at least 85% by weight of acrylonitrile, the residue being an ethylenically unsaturated comonomer copolymerizable with acrylonitrile, or blends of polymers wherein the total content of polymerized acrylonitrile is higher than 70% by weight. The term also includes "modacrylic fibers" which are copolymers comprising from 35 to 85% by weight of polymerized acrylonitrile.

The fiber diameter is required to be small, i.e., less than 12, and preferably less than 10, micrometers. especially preferably the fibers will have an average diameter in the range of about 2–12 micrometers. It is necessary that the fibers have a minimum length in the range of 0.5–3 millimeters, and a maximum length of about 6 millimeters. When the fiber diameter and length exceeds these limits, dispersion into the rubber can become difficult, and reinforcing effects can be adversely affected. A most important characteristic is the aspect ratio, length divided by diameter (L/D). It has been found that aspect ratios must be no less than about 20–50, and preferably substantially higher, 100, or even up to 300, but no advantage is seen in going higher. The aspect ratio can be increased by using the smaller diameter fibers, or longer fibers with the larger diameter fibers. If the aspect ratio falls below 20–50, the flexibility and strength increase becomes unacceptably small. If the aspect ratio rises to over approximately 400, dispersion into the rubber matrix can become difficult and the resultant composite can be non-uniform. The best balance of properties seems to be achieved with fibers of 2 to 12 micrometer diameters and lengths between about 0.5 and 5 millimeters.

The improved fiber reinforced materials of the present invention are formed by intimately blending fibers comprised of engineered microdenier acrylic homo- or co-polymers with a natural or synthetic rubber, either neat, or in the form of a solution, latex or dispersion in water or an organic solvent, such as toluene. The rubber can also contain varying amounts of inorganic particulate fillers, such as mica, silica, calcium carbonate, carbon black, clay, and the like, and will typically also include compounding agents such as accelerators, curatives, and antioxidants, in order to achieve the desired saturate rheology and final product characteristics. Other organic and/or organic fibers may be present. The composition can be converted to sheets, e.g., by conventional beater addition technology, or by hot/-cold roll milling, etc., and cured by conventional methods, such as between the platens of a heated press.

Another type of gasket product is called a "formed-in-place" gasket. An elastomeric binder, usually solvent based, and fillers/fibers/etc., comprise such products. For application, the compositions are deposited as sealants directly on the surfaces to be mated. The compositions require a period of time for the escape of some solvent before mating the "gasketed" surfaces.

In an especially convenient manner of proceeding, there is provided a beater saturated, water-laid, asbestos-free, rubberized gasket forming composition, typically in the form of a flat sheet, which exhibits excellent tensile strength, heat resistance and creep resistance and which comprises acrylic fibers, alone, or in further combination with other fibers, such as cellulose fibers or aromatic polyamide fibers, at least one inorganic or cork filler, and a suitable binder. The flat sheet can be made by any of the well-known processes for forming such sheets from fibers, fillers and binders, so long as the requisite amounts of these ingredients are employed as hereinafter described. To produce the sheet in accordance with this convenient procedure of the present invention an aqueous slurry comprising microdenier fibers and at least one inorganic filler is mixed with from about 2 to about 40 parts by weight add-on per 100 parts by weight of the total fiber and filler weight of a soluble salt selected from the group consisting of aluminum salts, ferric salts, and stannic salts followed by the addition of sufficient amount of an alkaline hydroxide to provide a furnish pH within the range of from about 6 to about 10 and preferably from about 7 to about 8. The alkaline hydroxide converts the soluble salts to a water insoluble hydroxide. A synthetic rubber latex is then added to the mixture until the latex precipitates onto the fibers and fillers. Water is then removed from the resulting furnish composition to form the flat sheet.

The aqueous furnish composition can also include a latex antioxidant, ceramic or glass fibers, mineral wool, retention aids, biocides, latex curing agents, latex dispersing agents and the like.

The aqueous furnish composition will contain from about 3 to about 60 parts, and preferably from about 5 to 25 parts, by weight of microdenier acrylic fibers per 100 parts of the total fiber and filler weights.

The aqueous furnish composition will contain at least one inorganic filler present in an amount within the range of from about 10 to 80 parts, and preferably 40 to 70 parts by weight total inorganic filler per 100 weight parts of the total fiber and filler composition. The inorganic filler will be selected from the group consisting of paper filler clay, wollastonite, talc, calcium carbonate, mica, and diatomaceous earth, mixtures of the foregoing, and the like. Particularly suitable fillers include wollastonite of P-4, P-1 or C-1 grade, all commercially available from Interpace Company, kaolin paper filler clays designated "Hi-Opaque clay," commercially available from Freeport Kaolin Clay Company, "Narvon" paper filler clay, commercially available from Combustion Engineering Inc., and "Klondyke" paper filler clay or "Klondyke KWW" paper filler clay, both commercially available from Engelhart Minerals and Chemicals Corporation. Special mention is made of talc, particularly Platey Talc, commercially available from Pfizer Incorporated under the trade designation "M-12-50." The fillers employed must be chemically inert so that they do not interfere with the precipitation of the rubber latex during formation of the felt sheet.

The aqueous furnish composition will contain from about 10 to about 40 parts by weight add-on of a suitable binder per every 100 parts of the total fiber and filler weight. Any suitable binder can be employed which is used in the prior art to bind fibers and fillers including synthetic rubber and resins. In a preferred embodiment of the present invention the fibers and fillers are bound together by a synthetic rubber which is deposited on the fibers and fillers by precipitation from a latex of the synthetic rubber. Any suitable synthetic anionic-type rubber latex can be employed-including nitrile rubber, styrene butadiene latexes, carboxylated styrene butadiene latexes, carboxylated acrylonitrile butadiene, polychloroprenes, and the like. These latexes can be used singularly or in combination. Particularly suitable rubber latexes include Reichhold Corporations's 4700 A nitrile latex, which has 40% total solid content and a pH of 9 and BF Goodrich's 1572X45 Hycar nitrile latex, which has a 47% total solid content, a pH of 6.5, a specific gravity of 0.99 and a Brookfield viscosity of 85 cps. Special mention is made of Goodyear Corporation's Chemigum 260, a nitrile latex having a total solids content of 35%.

The aqueous furnish composition will preferably contain about 0.2 to about 2 parts by weight of a latex antioxidant per 100 parts of the total fiber and filler weight. A particularly suitable latex antioxidant is designated "Flectol H," commercially available from Monsanto Industrial Chemicals Company. Flectol H is polymerized 2,2,4-trimethyl-1,2-dihydro quinoline. Other suitable antioxidants include B. F. Goodrich Chemical Company's "Agerite White" antioxidant, which is sym Di-beta-naphthylpara-phenylenediamine.

As stated above, ceramic fibers may optionally be added to the aqueous furnish composition of the present invention. Suitable ceramic fibers include Babcock and Wilcox's chopped ceramic fiber available under the trade designation "Kaowool," which is an aluminasilica ceramic fiber.

As stated above, standard latex curing agents may be employed in conjunction with the rubber latex binders utilized herein. One such standard latex cure package consists of 42 wt. % sulfur, 38 wt. % zinc 2-mercaptobenzothiazole, and 20 wt. % zinc dimethyidithiocarbamate. Other standard latex curing agents or cure packages are wellknown in the art, will be described in the working examples which follow, and may be similarly employed herein.

It will be understood that the amounts of the ingredients used to produce the compositions for forming gaskets and the like of the present invention can be varied within the ranges specified, but that they are interdependent and must be varied so that a gasket forming composition as described herein can be produced. For example, those skilled in the art will appreciate that if the lower limits of the ranges for the acrylic fibers and the optional other fibers are employed, and therefore, that the upper limit of the inorganic filler is used, the lower limit of binder may not be sufficient to bind the large amount of filler.

In another convenient manner of proceeding, the procedure outlined in U.S. Pat. No. 4,423,109 may be used to manufacture a reinforced high density sheet material to be used as a gasket. In this procedure, the engineered acrylic fibers are saturated with an aqueous dispersion of chloroprene rubber latex and a filler to produce a composition with, e.g., a 34 wt. % rubber content. The aqueous dispersion can for example comprise the following solids (parts by weight): chloroprene rubber, 50 parts, mica (C3000), 50 parts, zinc oxide, 7.5 parts, sulfur, 2 parts, nickel butyl carbonate, 5 parts, antioxidant, 2 parts, and phenolic resin, 10 parts.

The gasket mix then is dried in a circulating oven at 230 degrees F. and the rubber is then dried by pressing the sheet between hot platens, at 2000 pounds per square inch and at 320 degrees F. for two minutes.

Properties of the sheets are determined by standard tests methods as follows:
C D Tensile, psi; per ASTM F 152
Sealability, ml/hr; per ASTM F 37, Fuel A 250 psi, 30" Hg
A Creep, %; per ASTM F38B, 22 Hrs, 105° C., 3000 psi
B Creep, %; per ASTM F38B, 20 Hrs, 150° C., 2500 psi
Compressibility @ 5000 psi; per ASTM F36, Type 1 material
Elmendorf tear, gms; per ASTM D689

In another manner of proceeding, the procedure outlined in U.S. Pat. No. 4,866,109 may be used to manufacture a reinforced high density sheet material to be used as a gasket. In this procedure, a putty-like mix is applied to the nip of a standard two roll sheeting machine, for example, a Troester machine, having hot and cold rolls. The mix is put into the nip (the region where the cylinders are closest to one another) between the rolls, with the distance between the rolls and the pressure between the rolls being controlled. The mix is applied across the nip so that the mix is spread evenly across the nip. The mix adheres to the hot roll, producing reinforced material in the shape of an open-ended tube, the tube having an inside diameter identical to the diameter of the hot roll of the Troester machine. Heat and pressure are used to cure the reinforced material while it is on the roll. The material is then removed from the roll by cutting the tube along its length, so that a rectangular piece of reinforced material results.

In the manufacture of fiber reinforced high density gasketing material using such a two roll sheeting machine, different compositions for a starter layer, a body layer, and a finish layer are utilized to produce a gasket. That is, separate layers are built upon the hot roll in order to obtain the desired reinforced material.

A starter mix, which forms a starter layer, is used to get material to adhere to the surface of the hot roll. The body mix, inserted into the nip of the rollers next, forms the body layer atop the starter layer. The body layer comprises the majority of the material in the finished product, and contains the greatest amount of reinforcing agent. The finish layer provides a smooth surface atop the body layer. The finish layer is thin and is generally used for cosmetic purposes. The composition of the starter layer mix and the finish layer mix may be the same.

The following description is intended as a generalized discussion of another means to produce high density material suitable for gaskets and the like, which incorporates an microdenier acrylic reinforcing fiber in its formulation. Parts are by weight.

A starter layer mix composition may be prepared by mixing 10 parts of natural rubber and 56 parts of toluene for 30 minutes. Thereafter, to this mixture is added 0.5 parts of zinc oxide as activator, 0.1 parts of sulfur as vulcanizer, 0.05 parts of benzothiazyl disulfide as accelerator, 0.1 parts of 2,2-methylene-bis 4-methyl-6t-butyl phenol as antioxidant, 0.2 parts of Stantone ® 4005 Blue as Colorant, (available from the Harwick Chemical Corporation of Akron, Ohio); and 30 parts of calcium metasilicate as filler. The reaction mixture is stirred for 15 minutes. Thereafter, 30 parts of clay is added to the mixture, and the mixture is stirred for an additional 45 minutes.

A body layer mix composition is prepared by mixing 70 parts of Hycar ® 1492P80 acrylonitrile-butadiene copolymer (available from the B. F. Goodrich Company of Cleveland, Ohio), 18 parts of Ameripol ® 1012 styrene-butadiene copolymer (available from the Goodrich Chemical Company of Cleveland, Ohio), 12 parts of natural rubber, and 100 parts of toluene for 15 minutes. Thereafter, 400 parts of clay filler, 1.5 parts of tetramethylthiuram-disulfide as accelerator, 5.0 parts of zinc oxide as activator, 3.0 parts of sulfur as vulcanizer, 1.0 part of 2-mercaptobenzothiazole as accelerator, 1.0 part of Stantone ® 4005 Blue Colorant, 0.2 parts of SRF black colorant, and 1.0 part of AgeRite Resin D (a polymerized 1,2-dihydro-2,2,4-trimethylquinoline antioxidant which is available from the R. T. Vanderbilt Company of Norwalk, Conn.) are added to the reaction mixture, and the mixture is then stirred for 15 minutes. One hundred and twenty-five parts of the microdenier acrylonitrile-containing reinforcing fiber is then added to the reaction mixture, and the reaction mixture is then stirred for 15 minutes. Then 60 parts of toluene is added to the reaction mixture, and the mixture is stirred for an additional 60 minutes.

A finish layer mix composition is prepared by mixing 8 parts of Hycar ® 1092P80 acrylonitrile-butadiene copolymer and 2 parts of Ameripol ® 1012 styrene-butadiene copolymer for 5 minutes. Fifty parts of toluene is added to the reaction mixture, and the reaction mixture is then stirred for 25 minutes. Then to this reaction mixture are added 0.5 parts of zinc oxide as activator, 0.2 parts of sulfur as vulcanizer, 0.1 part of AgeRite Resin D. as antioxidant, 20 parts of barium sulfate as filler, 0. 14 part of Stantone 4006 Blue Colorant, and the mixture is stirred for 15 minutes. Thirty parts of clay as filler is added to the reaction mixture and the mixture is then stirred for an additional 45 minutes.

The gasket sheet is prepared on a sheeter, such as the Troester sheeter Model KD-IT 30115, which is manufactured by the Troester Company of Hannover, Wulfel, West Germany. The roll temperature is set at from about 230-240 degrees F.; the speed on the meter gauge is set from about 30 to about 35 meters per minute; and the pressure gauge is set at 1013 kN (kilonewtons) × 10. A sufficient amount of the starter composition of this example is added to the sheeter to completely cover the roll. Toluene and other volatiles are evaporated during processing. When the roll is coated, the pressure gauge is reset to above 5-6 kN × 10, and the body composition of this example is then added to the sheeter; when the hot roll of the sheeter begins picking up the body composition coating, the speed on the meter gauge is reset to 20 meters per minute. After the thickness of the sheet on the sheeter reaches about 0.061 inch, the finish composition is coated onto the sheet until the total thickness of the sheet is about 0.063 inch. Thereafter, the sheet is removed from the sheeter. Of course, other sheet thicknesses such 1/32 inch and ⅛ inch may be used.

The gaskets are analyzed by tensile strength tests in which an "average tensile strength" value is determined by cutting sample strips of gasket material parallel to and perpendicular to the line of contact (of the rollers of the sheeter machine) upon the gasket sheet. That axis which is perpendicular to the line of contact is known as the "machine direction"; that axis which is parallel to the line of contact is herein designated as the "anti-machine" direction. The ratio of the tensile strength in machine direction to the tensile strength in anti-machine direction is typically about 3:1 for the gasket sheet. Typically, for example, for a ratio of 3:1 and average tensile of 2400 psi, the machine direction tensile is 3600 psi while the anti-machine direction is 1200 psi. The orientation of the engineered acrylic fiber during processing by the rollers causes some orientation the fibers which results in greater strength along one axis while producing a lower strength along the other axis.

In general the gasket compositions comprising elastomeric binders and the reinforcing amounts of microdenier acrylic fibers can be prepared readily by simply mixing the fibers into the resin system with conventional mixers, such as ribbon blenders, vertical or horizontal blenders, Koneaders, helical mixers, sigma mixers, Banbury mixers, two roll mills, single and twin screw extruder mixers and other known blenders. The compositions can be converted to sheets and cured also in conventional ways well known to those skilled in the art. Gaskets, and other molded articles and tires and the like can be formed from the sheets and from the mixed compositions also in well known ways in conventional equipment.

The elastomeric resin matrices will contain curatives and they can contain conventional additives in conventional amounts, such as pigments, dyes, heat stabilizers, antioxidants, plasticizers, lubricants, UV-stabilizers, flame retardant agents, processing aids, foaming agents, and the like in order to further improve the properties, including processability, of the gasket composition.

The illustrative examples which follow are intended to show how the microdenier acrylic fiber reinforced materials of the invention exhibit improved properties in gaskets and in rubber sealants in comparison with those made following the teachings of the prior art.

DESCRIPTION OF THE PREFERRED EMBODIMENTS

The following examples illustrate the invention. They are not intended to limit the claims in any manner whatsoever. All parts are by weight, unless otherwise indicated.

In the first series of examples is demonstrated the preparation of asbestos-free rubberized gasket-forming compositions of this invention. In these examples, the properties of Tensile Strength and Elongation, Compressibility and Recovery, Sealability, Creep Relaxation, and environmental resistance were determined according to the procedures set forth in, respectively, ASTM test methods number D882 and F152; F36; F37; F38 and F146. The Dynamic Mechanical Analysis results were determined by DMA Test No 982. The compositions' heat aging properties were determined, unless otherwise noted, by heating the composition in an oven for 24 hours at 600° F. and subsequently testing its tensile strength.

EXAMPLES 1 AND 2

The basic formulation used was as follows:

| Ingredients | Amounts by weight |
|---|---|
| Reinforcing Fiber (as specified) | 15% |
| Platy Talc filler (Pfizer M-12-50) | 70% |
| NBR Latex Binder (Chemigum ® 260) | 15% |
| | 100% |
| Sulfur | 2 phr |
| Zinc oxide | 4 phr |
| Butyl zimate | 1.5 phr |
| Agerite ® D antioxidant | 2 phr |
| Precipitation regulator (TAMOL ® N) | 2 phr |
| Precipitation Agent (Alum) | 5-10 phr | phr = parts per hundred of rubber

The basic procedure for forming the material into gaskets was as follows:
1. Mix fiber, filler, cure agents and latex in deionized water using a Waring ® Blender on low speed.
2. Precipitate the latex with alum while intermittently mixing in the blender.
3. Dilute the mixture to 1% solids, form into 12 in. × 12 in. sheet in a papermaking sheet mold.
4. Precompact sheet in a press, partially dry in an oven, press cure 20 minutes at 250° F., and 600-900 psi., and finally post cure in an oven for 20 minutes at 250° F.

Example 1

A microdenier acrylic fiber having the following characteristics is used for Example 1: nominal diameter, 7 microns (0.5 denier); nominal length, 1.5 micrometers, unfibrillated staple.

Example 2

A microdenier acrylic fiber having the following characteristics is used for Example 2: nominal diameter, 10 microns; nominal length, 0.0625 inches; density, 1.17 g/cm; tensile strength, 75 ksi; modulus. 0.8 msi; elongation, 25%; moisture content, <4%; and color, white, also unfibrillated staple.

The resulting dried hand sheets are recovered as rubberized gasket forming compositions of this invention suitable for use to produce gaskets having a thickness for testing of 0.032 inches. The gaskets are tested and found to have the following properties:

| Example | Properties |
|---|---|
| 1 | Tensile strength of 2.60 ksi Elongation of 17.6% Density of 1.55 g/cc. |
| 2 | Creep relaxation of 47% (22 hrs @ 150° C., 3000 psi) Tensile strength of 2.64 ksi Elongation of 16.5% Density of 1.54 g/cc. |

The high elongation values are noteworthy and significant for gasket use.

EXAMPLE 3

The procedure of Example 2 is repeated substituting for the microdenier acrylic fiber of 10 micrometers diameter 0.0625 inch nominal length, a fiber of 0.04 inches in length.

The resulting dried hand sheet was recovered as rubberized gasket forming composition of this invention suitable for use to produce gaskets having a thickness for testing of 0.032 inches. The gasket was tested and found to have a creep relaxation of 48% (22 hrs @ 150° C., 3000 psi), a tensile strength of 2.57 ksi, an elongation of 15.9%, and a density of 1.52 g/cc.

EXAMPLE 4

The procedure of Example 1 is repeated substituting for the microdenier acrylic fiber of 7 microns in nominal diameter, a microdenier acrylic fiber having a nominal diameter of 12 microns.

The resulting dried hand sheet was recovered as rubberized gasket forming composition of this invention suitable for use to produce gaskets having a thickness for testing of 0.032 inches. The gasket was tested and found to have a creep relaxation of 45% (22 hrs @ 150° C., 3000 psi), a tensile strength of 2.39 ksi, an elongation of 13.3%, and a density of 1.55 g/cc.

The foregoing Examples demonstrate the high elongations (and flexibility) achievable with the microdenier acrylic fibers of the invention.

COMPARATIVE EXAMPLES 1A* AND 2A*

The procedure of Example 1 is repeated substituting for the microdenier acrylic unfibrillated staple fiber of 7 microns in nominal diameter, respectively, a "normal" denier pulped acrylic fiber having a nominal diameter of 20 microns, and a nominal length of 0.28 inches; and an aromatic "normal" denier polyamide pulped fibrillated fiber (KEVLAR ® 361) having a nominal diameter of about 20 microns, and a nominal length of 0.16 inches.

The resulting dried hand sheets were recovered as rubberized gasket forming compositions for purposes of comparison suitable for use to produce gaskets having a thickness for testing of 0.032 inches. The gaskets were tested and compared with Examples 1-4, with the following results:

| Example | Fiber Diameter Microns | Gasket Thickness (in) | Gasket Density (g/cc) | Tensile Strength (Ksi) | Tensile Elong (%) | Creep Relax 22 hr @ 150° C. 300 psi, % |
|---|---|---|---|---|---|---|
| 1 | 7 | .032 | 1.55 | 2.60 | 17.6 | — |
| 2 | 10 | .032 | 1.54 | 2.64 | 16.5 | 47 |
| 3 | 10 | .032 | 1.52 | 2.57 | 15.9 | 48 |
| 4 | 12 | .032 | 1.55 | 2.39 | 13.3 | 45 |

-continued

| Example | Fiber Diameter Microns | Gasket Thickness (in) | Gasket Density (g/cc) | Tensile Strength (Ksi) | Tensile Elong (%) | Creep Relax 22 hr @ 150° C. 300 psi, % |
|---|---|---|---|---|---|---|
| 1A* | 20 | .034 | 1.52 | 1.83 | 9.1 | 50 |
| 2A* | 20 | .033 | 1.52 | 2.73 | 9.1 | 43 |

Example 1 uses fibers with nominal 1.5 mm lengths;
Examples 2 and 4 use fibers with nominal 1/16 in lengths;
Example 3 uses fibers with nominal 0.04 in lengths;
Example 1A* uses acrylic fiber pulp with nominal 0.28 in lengths;
Example 2A* uses aromatic polyamide fiber pulp with nominal 0.16 in lengths The foregoing data demonstrate that the microdenier acrylic fibers (Examples 1–4) provide gaskets with a substantial improvement in flexibility (elongation), in comparison with fibers used as asbestos replacements in the present state of the art (Examples 1A*–2A*), all other factors being equal.

EXAMPLES 5, 5A* and 5B*

A model polysulfide rubber foamed-in-place gasket system was prepared and cured using 1.5 parts per hundred rubber (phr) of reinforcing acrylic fibers of 10 micrometers diameter and 1.5 mm length, and compared to systems containing a commonly used reinforcement fiber and to unreinforced sealant.

The system composition is LP32 polysulfide resin (Morton International) with a curing agent consisting of 30 phr of 50% lead peroxide in dibutylphthalate.

The acrylic fibers are mixed into the polysulfide resin with a lab spatula until uniformly dispersed. The mixture is degassed under vacuum for 30 minutes at room temperature. The curing agent is mixed in gently with a spatula to avoid air introduction. The mixed sealant composition is cured into a 2 mm thick rubber sheet by sandwiching the sealant between glass plates and curing the composition for 16 hours at 55 degrees C. For comparison purposes, an unreinforced composition and a composition containing 1.5 phr aramid pulp were prepared. All rubber sheets were measured for their tensile properties by ASTM D412, and the results obtained were as follows:

| REINFORCING FIBER | TENSILE STRENGTH (PSI) | % ELONGATION |
|---|---|---|
| Example 5 | | |
| 1.5 phr microdenier fiber, 10 micrometer diameter, 1.5 mm length | 178 | 100 |
| Comparative Example 5A* | | |
| 1.5 phr aramid pulp | 168 | 32 |
| Comparative Example 5B* | | |
| System without fiber | 125 | 210 |

The results show that the addition of microdenier fibers enables strength improvements in the cured system at least equal to aramid pulp, while maintaining half of the elongation of the gasket, compared to aramid, which maintains only 15% of the gasket elongation.

EXAMPLE 6

If the procedure of Example 1 is repeated substituting for one-half of the microdenier acrylic fiber of 9 microns in nominal diameter, an equal weight of an aromatic polyamide pulp (KEVLAR® 361), and if the resulting dried hand sheet is recovered, a rubberized gasket forming composition of this invention employing a 50—50 mixture of fibers will be obtained which is suitable for use to produce gaskets having a thickness for testing of 0.032 inches. If the gasket is tested it will be found to have creep relaxation properties, a tensile strength, an elongation, and a density suitable for use in gaskets requiring high flexibility.

EXAMPLES 7 AND 8

If the general procedure of Example 1 is repeated, substituting for the acrylonitrile-butadiene copolymer rubber, a mixture comprising equal weights of acrylonitrile-butadiene copolymer rubber, styrene-butadiene copolymer rubber, and natural (polyisoprene) rubber, or a chloroprene rubber, gaskets having improved flexibility because the microdenier acrylic fiber is present will be

EXAMPLE 9

If the procedure of Example 1 is repeated, substituting fibrillated microdenier fibers for the unfibrillated fibers, a gasket composition having its properties improved with the reinforcing fiber in accordance with this invention will be obtained.

EXAMPLE 10

If the procedure of Example 1 is repeated, substituting microdenier modacrylic fibers (50 wt. % acrylonitrile - 50 wt. % vinyl chloride) for the acrylic fibers, gasket compositions having their properties improved with the engineered microdenier modacrylic fibers in accordance with this invention are obtained.

EXAMPLES 11-19 AND 20A*

The procedure of Example 1 is repeated substituting a variety of acrylic fibers as below specified for the microdenier acrylic fiber used and gaskets are made from the respective compositions and tested with the following results:

| Example | Fiber Type | Fiber Denier | Fiber Diameter (microns) | Tensile Strength (Ksi) | Elong (%) |
|---|---|---|---|---|---|
| 11 | 0.5 md | 0.5 | 7 | 2.60 | 17.6 |
| 12 | 0.8 md | 0.8 | 10 | 2.65 | 16.5 |
| 13 | X-95 | 1.1 | 11.5 | 2.38 | 13.3 |
| 14 | Courtelle | 1.3 | 13 | 2.22 | 13.0 |
| 15 | Creslan | 2.0 | 16 | 2.20 | 15.6 |
| 16 | X-110B | 3.2 | 20 | 2.00 | 9.2 |
| 17 | X-1 | 5.0 | 25 | 2.00 | 9.2 |
| 18 | X-2 | 7.0 | 29 | 2.00 | 9.2 |
| 19 | SEKRIL | 10.0 | 35 | 1.60 | 6.8 |
| 20A* | CRESLAN | 17.0 | 45 | 1.50 | 6.9 |

The foregoing data are set forth as points in the graph which comprises the Drawing. They are evidence of the positive effect on gasket tensile properties as the acrylic fiber diameter decreases from the "normal" denier range down into the microdenier range discovered by the present invention to lead to vast improvements in gasket flexibility.

The above-mentioned patents, publications and test methods are incorporated herein by reference.

Many variations of the present invention will suggest themselves to those skilled in the art in light of the above detailed description. For example, if fibers with various cross-sectional shapes such as circular, triangular, "C"-shaped, dog-bone, multi-lobal, rectangular, etc. are used, substantially the same results will be obtained. Instead of the rubbers exemplified, polyurethane rubber and/or ethylene-propylene rubber may be used. The engineered acrylic fibers can be replaced in minor part by other organic microdenier fibers, such as polyester fibers, polyolefin and polyimide fibers. Instead of talc, mica, silica, calcium carbonate, carbon black, clay, paper filler clay, wollastonite, diatomaceous earth, mixtures thereof, and the like, can be used as fillers. Instead of a sulfur-or a lead peroxide-vulcanizable binder system, one can be used which cures with other peroxides, such as benzoyl peroxide. Instead of an aqueous dispersion of elastomeric binder, an organic solvent-based dispersion can be used. Instead of a beater addition process or a formed-in-place process, a two-roll gasket forming machine and process can be used. All such obvious modifications are within the full intended scope of the appended claims.

We claim:

1. An asbestos-free fiber reinforced material comprising:
   (a) an elastomeric matrix composition; and
   (b) an effective reinforcing amount of acrylic fibers with a small diameter of less than about 12 microns, a length ranging from about 0.5 to about 3 mm, and having a minimum aspect ratio (L/D) in the 20–50 range, so as to provide enhanced strength and flexibility to gaskets, tires, timing belts, power transmission couplings, shock absorbers, sealants, and the like, made therefrom.

2. A material as defined in claim 1 wherein matrix composition (a) comprises from about 70 to about 90 parts by weight and reinforcing fibers (b) comprise from about 30 to about 10 parts by weight per 100 parts by weight of (a) and (b) combined.

3. A material as defined in claim 1 wherein matrix composition (a) comprises:
   (a)(i) a natural or synthetic rubbery elastomer;
   (a)(ii) an inorganic particulate filler; and
   (a)(iii) compounding agents.

4. A material as defined in claim 3 wherein, in matrix composition (a), elastomer (a)(i) comprises from about 10 to about 80 parts by weight, filler (a)(ii) comprises from about 10 to about 80 parts by weight, and compounding agents (a)(iii) comprise from about 2 to about 20 parts by weight per 100 parts by weight of (a)(i), (a)(ii), and (a)(iii), combined.

5. A material as defined in claim 3 wherein said elastomer (a)(i) is selected from natural rubber; a synthetic rubber selected from chloroprene rubber, nitrile rubber, isoprene rubber, styrene-butadiene rubber, polyurethane rubber, ethylene-propylene rubber or a mixture of any of the foregoing.

6. A material as defined in claim 3 wherein said filler (a)(ii) is selected from talc, mica, silica, calcium carbonate, carbon black, clay, or a mixture of any of the foregoing.

7. A material as defined in claim 1 wherein the microdenier acrylic fibers (b) are used in combination with reinforcing non-acrylic fibers.

8. A material as defined in claim 7 wherein said non-acrylic fibers comprise cellulose fibers, glass fibers, polyolefin fibers, polyamide fibers, polyester fibers, polyimide fibers, or a mixture of any of the foregoing.

9. A material as defined in claim 1 wherein the microdenier acrylic fibers (b) are non-fibrillated.

10. A material as defined in claim 1 wherein the microdenier acrylic fibers (b) are fibrillated.

11. A material as defined in claim 1 wherein the microdenier acrylic fibers (b) are comprised of a polymer containing acrylonitrile in a quantity more than 35 wt. %.

12. A material as defined in claim 1 wherein the microdenier acrylic fibers (b) are comprised of a polymer containing acrylonitrile in a quantity more than 85 wt. %.

13. A material as defined in claim 1 wherein the microdenier acrylic fibers (b) have a uniform length.

14. A material as defined in claim 1 wherein the microdenier acrylic fibers (b) comprise a mixture of lengths.

15. A material as defined in claim 1 wherein the microdenier acrylic fibers (b) have an average diameter in the range of about 2–15 micrometers.

16. A material as defined in claim 1 wherein the microdenier acrylic fibers (b) have an average diameter in the range of from about 5 to about 10 micrometers.

17. A material as defined in claim 1 wherein the microdenier acrylic fibers (b) have an aspect ratio (L/D) of greater than about 100.

18. An asbestos-free reinforced gasket produced from the material as defined in claim 1 wherein the reinforcement (b) comprises microdenier monocomponent or bicomponent fibers of a polymer containing acrylonitrile in a quantity more than 35 wt. %, said fibers having a fiber diameter of less than about 12 microns, a fiber length greater than 0.5 mm, and a minimum aspect ratio in the range of 20–50, a circular cross-sectional shape, so as
   (i) to provide the gasket with improved flexibility, and
   (ii) to provide a gasket with greater elongation in comparison with a gasket reinforced with the corresponding fibers having a diameter of greater than 12 microns.

19. A gasket as defined in claim 18, wherein said microdenier fibers (b) are comprised of a polymer containing acrylonitrile in a quantity of more than 85 wt. %.

20. A gasket as defined in claim 18, wherein said microdenier fibers (b) have a uniform length.

21. A gasket as defined in claim 18, wherein said microdenier fibers (b) comprise a mixture of lengths.

22. A gasket as defined in claim 18, wherein said microdenier fibers (b) have an average diameter in the range of about 2–12 micrometers.

23. A gasket as defined in claim 22, wherein said microdenier fibers (b) have an average diameter in the range of from about 5 to about 10 micrometers.

24. A gasket as defined in claim 18, wherein said microdenier fibers (b) have an aspect ratio (L/D) of greater than about 100.

25. A gasket as defined in claim 18, wherein said microdenier fibers (b) have an average diameter in the range of about 5-12 micrometers, and have an aspect ratio (L/D) of greater than about 100.

26. A gasket as defined in claim 18 produced by a beater addition process.

27. A gasket as defined in claim 18 produced by a formed-in-place process.

28. An asbestos-free composition adapted for use in gaskets, said composition comprising:
(a) an curable elastomeric resin and a curative therefore, alone, or in further combination with:
  (i) a pigment,
  (ii) a dye,
  (iii) a heat stabilizer,
  (iv) an antioxidant,
  (v) a plasticizer,
  (vi) a lubricant,
  (vii) a UV-stabilizer,
  (viii) a flame-retardant agent,
  (ix) a processing aid,
  (x) a foaming agent,
  (xi) a filler,
  (xii) non-acrylic organic fibers and pulps,
  (xiii) inorganic fibers selected from glass, ceramic, mineral fibers, and the like, or
  (xi) a mixture of any of the foregoing, and
(b) an effective concentration of a reinforcement for said composition, said reinforcement comprising microdenier acrylic fibers with a small diameter of less than 12 microns, a minimum length in the range or 0.5-3 mm, and a minimum aspect ratio (L/D) in the 20-50 range so as to provide a gasket with increased elongation in comparison with those made from corresponding acrylic fibers having a diameter of greater than 12 microns.

29. A composition as defined in claim 28, wherein said elastomeric resin comprises a natural or synthetic rubber or a rubber latex, and said curative comprises a cross-linker, a free radical-generator, or high energy radiation selected from ultraviolet light, electron beams, or the like.

30. A composition as defined in claim 29, wherein said rubber comprises a mixture of acrylonitrile-butadiene copolymer rubber, styrene-butadiene copolymer rubber, and natural rubber, and said cross-linker comprises a vulcanizing amount of sulfur.

31. A composition as defined in claim 28 wherein the concentration of said microdenier acrylic fibers (b) is from about 10 to about 30 parts by weight per 100 parts by weight of (a) and (b) combined.

32. A composition as defined in claim 31 wherein the concentration of said microdenier acrylic fibers (b) is from about 15 to about 25 parts by weight per 100 parts by weight of (a) and (b) combined.

33. A composition as defined in claim 28, wherein the microdenier acrylic fibers (b) have an average diameter in the range of about 2-12 micrometers.

34. A composition as defined in claim 28, wherein the minimum aspect ratio (L/D) is greater than about 100.

35. An asbestos-free gasket forming composition comprising in weight parts per 100 parts of the total fiber and filler weight about 5 to 25 parts of microdenier acrylic fibers with a small diameter of less than 12 microns, a minimum length in the range or 0.5-3 mm, and a minimum aspect ratio (L/D) in the 20-50 range, alone, or in further combination with about 10 to 25 parts of other fibers; about 40 to 70 parts of at least one inorganic filler; and 10 to 40 parts added-on of a synthetic rubber binder.

36. The composition of claim 35 in which said fibers are employed in an amount within the range of about 3 to about 60 parts by weight per 100 parts the total fiber and filler weight.

37. The composition of claim 36 in which said fibers are employed in an amount within the range of about 5 to about 25 parts by weight per 100 parts of the total fiber and filler weight.

38. The composition of claim 35 in which said other fibers are aromatic polyamide fibers.

39. The gasket forming composition of claim 35 in which said at least one inorganic filler is selected from the group consisting of paper filler clay, wollastonite, talc, calcium carbonate, mica, and diatomaceous earth.

40. The gasket forming composition of claim 35 in which said at least one inorganic filler is employed in a total amount within the range of from bout 40 to about 70 parts by weight per 100 parts of the total fiber and filler weight.

* * * * *